Sept. 22, 1964 G. H. STOCKTON ETAL 3,149,407

METHOD FOR MANUFACTURING A HALL EFFECT READOUT DEVICE

Filed Dec. 3, 1962

GEORGE H. STOCKTON & NELSON C. YEW
INVENTORS

BY Nathan N. Kallman

ATTORNEY

United States Patent Office 3,149,407

Patented Sept. 22, 1964

3,149,407
METHOD FOR MANUFACTURING A HALL EFFECT READOUT DEVICE

George H. Stockton, Palo Alto, and Nelson C. Yew, Fremont, Calif., assignors to Ampex Corporation, Redwood City, Calif., a corporation of California Filed Dec. 3, 1962, Ser. No. 241,728
4 Claims. (Cl. 29—155.5)

This invention relates to a novel and improved method of manufacturing a Hall effect readout device, and in particular to a method for providing a Hall effect device having structural strength and a balanced configuration of electrical leads.

A Hall effect head (hereafter designated as a Hall head) has a particular characteristics that makes it extremely desirable for the playback of information recorded on a magnetic medium or tape. Hall heads require less space than conventional magnetic heads, because they may be made as very thin sections and do not need coils or inductances. A Hall head has a potential frequency response ranging from signals at D.C. up to the kilomegacycles per second range. Furthermore, Hall heads are flux sensitive and can directly sense the magnetic field associated with a recorded magnetic tape. In contrast, magnetic heads detect only the rate of change of flux of a recorded tape as it moves past the head, thus necessitating tape motion at controlled speeds relative to the magnetic head for proper frequency response.

However in the prior art there has been difficulty in fabricating Hall heads with very thin Hall elements, which are necessary to provide good resolution and efficient operation. Also, problems arise during manufacture when attaching terminals and electrical leads to the thin Hall elements because the elements are very fragile and subject to breakage. It would be desirable to fabricate a Hall effect head that has structural strength in addition to good signal resolution characteristics, and also one that lends itself to mass production methods with a minimum of breakage during manufacture and assembly.

An object of the invention is to provide a novel method of manufacturing and assembling Hall effect heads.

In an embodiment of this invention, a multiplicity of substantially identical Hall effect heads are made from a pair of ferrite slabs and a very thin Hall plate or element. The ferrite slabs are lapped and ground to a desired configuration with at least one flat surface of each slab being smoothly polished. A Hall plate is then secured to the smoothly polished surface of one slab, and the Hall plate which is now structurally reinforced by the ferrite slab is lapped and polished to a desired thickness. Thereafter, the second slab having a smoothly polished flat surface is affixed to the other side of the Hall plate to form a sandwich or multilayer assembly.

The assembly including the ferrite slabs and Hall plate is then cut and sliced into a plurality of Hall units, each unit having a pair of ferrite blocks encompassing a Hall element. Electrical contacts or terminals are then applied to each corner of the Hall element, and electrical leads are secured to each contact to provide a wired Hall effect unit ready for transducing operation. The Hall units may be incorporated in the front or rear gap of single gap or multichannel transducers or magnetic heads for transducing engagement with a magnetic medium or tape.

The invention will be described in greater detail with reference to the drawing in which.

Figures 1, 2, 3, 4, 5:
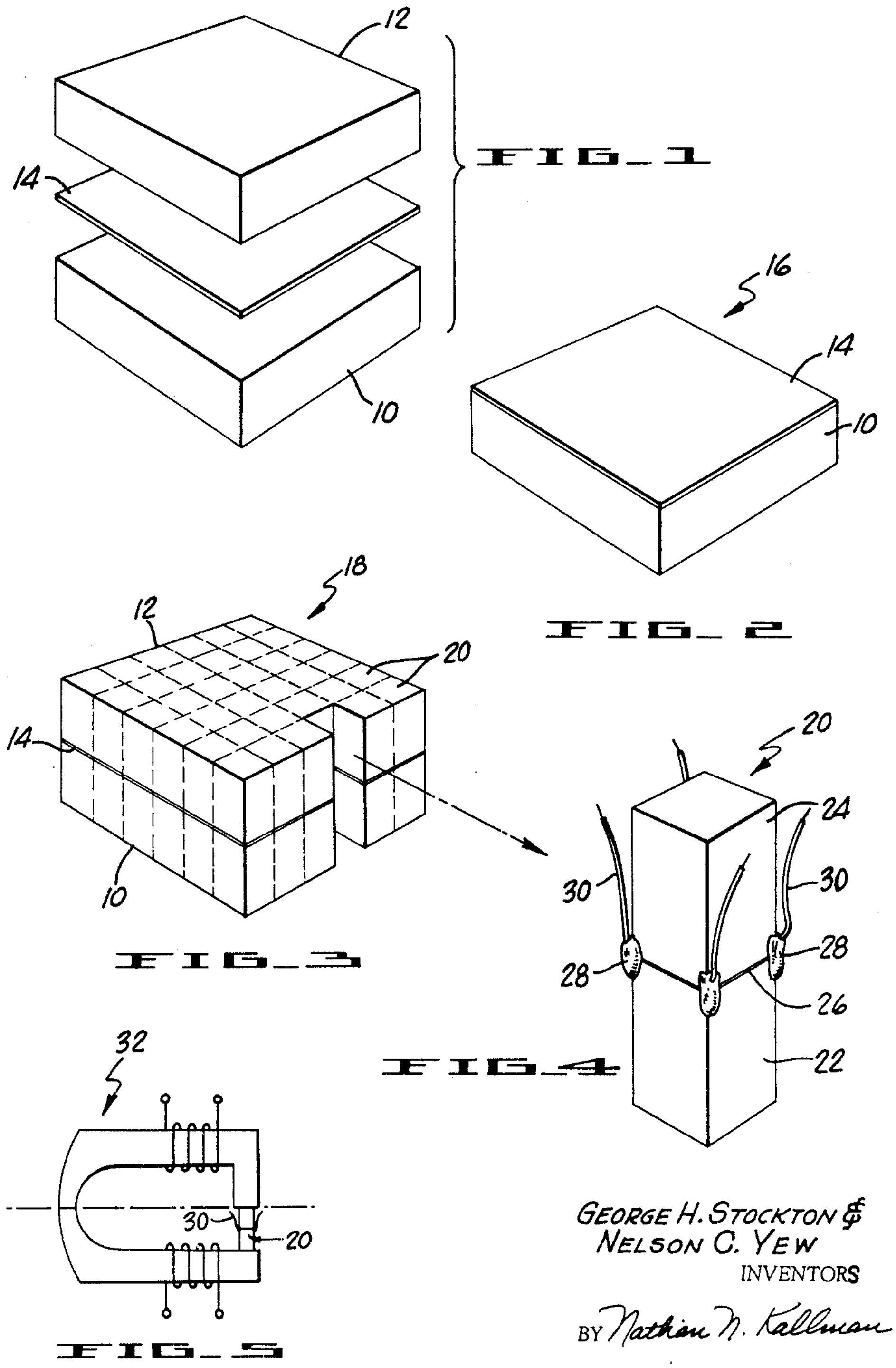
FIGURE 1 is an exploded perspective view of an assembly used in the inventive method of manufacturing Hall heads.
FIGURE 2 is a perspective view of a portion of the assembly of FIGURE 1.
FIGURE 3 is a perspective view of the assembly used for the preparation of a multiplicity of Hall units.
FIGURE 4 is a perspective view of a single Hall unit, having the electrical contacts and leads attached thereto.
FIGURE 5 is a plan view of a magnetic head incorporating a Hall unit in accordance with this invention.

With reference to FIGURE 1, a pair of ferrite slabs 10 and 12 are shown surrounding a thin Hall plate 14, made of indium antimonide for example, that has been preliminarily ground to a desired size and thickness, such as .010 inch. Each of the ferrite slabs 10 and 12 has been lapped and polished to a smooth, specular finish and has a surface that is coextensive with that of the Hall plate 14.

One of the ferrite slabs 10 is assembled with the Hall plate 14 by means of an epoxy resin, or other known cementing or bonding means to provide an assembly 16, having a very thin bond (less than .001 inch, for example) as shown in FIGURE 2. At this point, the Hall plate 14 has an increased structural strength by virtue of being bonded to the thicker ferrite slab 10. The Hall plate 14 is then lapped to a desired thickness, such as .0005–.001 inch, by means of a diamond parallel lapper. After having ground the Hall plate 14 to a preferred thickness for operation as a readout element, the second ferrite slab 12 which has been lapped and has a highly polished flat surface is cemented to the other side of the Hall plate 14.

This configuration is then cut and sliced by an ultrasonic impact grinder or a diamond saw, or other well known means, into a multiplicity of rectangular Hall effect units 20 comprising ferrite blocks 22 and 24 and a Hall element 26, as depicted by FIGURE 3. Thereafter, contacts 28 and electrical leads 30 are applied to the corners of the Hall element 26, resulting in a wired Hall unit as illustrated by FIGURE 4. The contacts 28 may be formed by soldering or by vacuum evaporation, for example, using indium or gold to provide reliable electrical contacts.

The wired Hall unit 20 may be employed with a magnetic transducer 32, such as illustrated in FIGURE 5. In this assembly, the Hall unit 20 is located in the rear gap area and may serve as a readout element during the playback mode of a magnetic tape apparatus. It is understood that other transducer configurations may be fabricated incorporating Hall units that have been assembled by the steps of this invention. Magnetic transducers employing the inventive Hall units provide an improved readout signal resolution and in addition have increased structural strength.

Such Hall units may be utilized in multichannel transducers wherein the units are stacked in each gap. Because the units are substantially identical, being made on a mass production basis, the stacked Hall units present a uniform array along the aligned gaps of the multigap transducer. This arrangement affords better equalization and improved response characteristics for the several signal channels being processed by the multichannel transducer. Other advantages and features may also be obtained by employing the inventive method for the manufacture of Hall effect heads.

What is claimed is:

1. A method for manufacturing Hall effect transducers comprising the steps of:

lapping and polishing a first ferrite slab;

attaching a Hall effect plate to a polished side of such ferrite slab;

lapping the Hall effect plate to a desired thickness while supported by the ferrite slab;

joining a second ferrite slab to the other side of such Hall effect plate to form a sandwich assembly;

severing the sandwich assembly into a multiplicity of like units, each having ferrite blocks encompassing a Hall element;
applying electrical contacts to the periphery of the Hall element; and
attaching electrical leads to such contacts.

2. A method for manufacturing Hall effect transducers comprising the steps of:
lapping and polishing a first ferrite slab;
cementing a Hall effect plate to a polished side of such ferrite slab;
lapping the Hall effect plate to a desired thickness while supported by the ferrite slab;
cementing a second ferrite slab to the other side of such Hall effect plate to form a sandwich assembly;
dicing the sandwich assembly into a multiplicity of like units, each having ferrite blocks encompassing the Hall element;
applying electrical contacts to the edges of the Hall elements by vacuum evaporation; and
attaching electrical leads to such contacts.

3. A method for manufacturing Hall effect transducers comprising the steps of:
lapping and polishing the ferrite slab;
cementing a Hall effect plate to a polished side of such ferrite slab;
lapping the Hall effect plate to a desired thickness while supported by the ferrite slab;
cementing a second ferrite slab to the other side of such Hall effect plate to form a sandwich assembly;

cutting the sandwich assembly with an ultrasonic grinder into a multiplicity of like units, each having ferrite blocks encompassing a Hall element;
applying electrical contacts to the corners of the Hall element; and
attaching electrical leads to such contacts.

4. A method for manufacturing Hall effect transducers comprising the steps of:
lapping and polishing a first ferrite slab;
attaching a Hall effect plate to a polished side of such ferrite slab;
lapping the Hall effect plate to a desired thickness while supported by the ferrite slab;
joining a second ferrite slab to the other side of such Hall effect plate to form a sandwich assembly;
severing the sandwich assembly into a multiplicity of like units, each having ferrite blocks encompassing the thin Hall elements;
applying electrical contacts to the corners of the Hall element by means of pressure and heat; and
inserting such Hall effect unit in a gap of a magnetic transducer.

References Cited in the file of this patent

UNITED STATES PATENTS

| | | |
|---|---|---|
| 2,112,636 | Sawyer et al. | Mar. 29, 1938 |
| 2,864,013 | Wood | Dec. 9, 1958 |
| 3,042,887 | Kuhrt et al. | July 3, 1962 |
| 3,082,507 | Kuhrt et al. | Mar. 26, 1963 |